(12) United States Patent
Hayashi et al.

(10) Patent No.: US 6,937,371 B2
(45) Date of Patent: *Aug. 30, 2005

(54) OPTICAL SCANNER AND IMAGE FORMATION APPARATUS

(75) Inventors: Yoshinori Hayashi, Tokyo (JP); Seizo Suzuki, Tokyo (JP); Atsushi Kawamura, Tokyo (JP); Hiromichi Atsuumi, Tokyo (JP); Kohji Sakai, Tokyo (JP); Akihisa Itabashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/866,716

(22) Filed: Jun. 15, 2004

(65) Prior Publication Data

US 2004/0233493 A1 Nov. 25, 2004

Related U.S. Application Data

(63) Continuation of application No. 10/247,702, filed on Sep. 20, 2002, now Pat. No. 6,771,407.

(30) Foreign Application Priority Data

Sep. 20, 2001 (JP) .......................................... 2001-287766
Sep. 18, 2002 (JP) .......................................... 2002-271602

(51) Int. Cl.[7] ............................................. G02B 26/08
(52) U.S. Cl. ........................ 359/196; 359/204; 359/205; 359/207; 359/212; 359/216
(58) Field of Search ................................. 359/196–226; 347/241–244, 256–261; 358/474, 481

(56) References Cited

U.S. PATENT DOCUMENTS 5,673,136 A * 9/1997 Inoue et al. ................. 359/205
5,818,622 A 10/1998 Hisa
6,195,190 B1 2/2001 Tachibe et al.

FOREIGN PATENT DOCUMENTS

JP 2804647 1/1993
JP 2736984 4/1998

* cited by examiner

Primary Examiner—James Phan
(74) Attorney, Agent, or Firm—Oblon, Spivak, McClelland, Maier & Neustadt, P.C.

(57) ABSTRACT

An optical system includes three optical systems. The first has a coupling lens. The second includes a lens having a positive power in a vertical scanning direction and forms the light flux into a line image extending in the horizontal scanning direction on a deflector. The third includes a first lens having a positive power in the horizontal scanning direction, and a second lens having a positive power in the vertical scanning direction. Lateral magnification in the horizontal scanning direction is set larger than that in the vertical scanning direction. Temperature near the first lens is maintained higher than that near the second lens.

20 Claims, 5 Drawing Sheets

OPTICAL SCANNER AND IMAGE FORMATION APPARATUS

BACKGROUND OF THE INVENTION

1) Field of the Invention

The present invention relates to an optical scanner used for laser-beam printers (LBP), regular paper facsimile systems (PPF), digital copying machines and the like, and an image formation apparatus that employs such an optical scanner.

2) Description of the Related Art

High density, such as 1200 to 2400 dpi (dots per inch) has recently been required as the scanning density in optical scanners. In order to achieve high density in optical scanning, it is necessary to decrease the beam diameter of optical beams condensed on a surface to be scanned. While a requirement for decreasing the beam diameter increases as the optical scanner has a higher density, it is also required to manufacture the optical scanner at a low cost. In order to deal with this requirement for low cost, a lens made of resin is often used for the scanning lenses. However, in the resin lens, image-forming misregistration is large due to a temperature change, and it is difficult to decrease the beam diameter.

As an apparatus in which such image formation misregistration is suppressed, there are known apparatus disclosed in U.S. Pat. No. 2,736,984 (Publication 1), and U.S. Pat. No. 2,804,647 (Publication 2).

The apparatus in the Publication 1 has following components. That is, a collimator comprising a semiconductor laser, a collimator lens and a retaining member which fixes and retains these components, and a scanning image formation optical system which forms an image of a light flux from the collimator deflected by a deflection unit on a photosensitive material. By optimizing a coefficient of linear expansion, a refractive index or the like of the collimator lens, the scanning image formation optical system and the retaining member, the image formation misregistration of the whole optical system is reduced.

The apparatus in the Publication 2 comprises following components. That is, a first image formation optical system which forms an image of light from a light source linearly, and a second image formation optical system which allows optical beams deflected by a deflection apparatus having a deflecting reflective surface to condense on a surface to be scanned, at an image formation position of the first image formation optical system. By using a resin lens (plastic lens) having a negative power for the first image formation optical system, an image formation misregistration which occurs in the second image formation optical system is cancelled, to thereby reduce the image formation misregistration of the whole optical system.

As the optical scanning speed of the optical scanner increases, it becomes necessary to rotate a deflector such as a polygon scanner at a high speed. Therefore, the temperature in the vicinity of the deflector differs from the temperature in the vicinity of a position away from the deflector, due to heat generated by the deflector which rotates at a high speed, and hence the temperature distribution in the optical scanner, that is, in an optical housing, becomes non-uniform. As a result, it is necessary to take measures for suppressing image-forming misregistration, on the assumption that the temperature distribution in the optical scanner is non-uniform.

However, in any of the Publications 1 and 2, it is not described nor suggested that image formation misregistration is suppressed on the assumption that the temperature distribution in the optical scanner (that is, in the optical housing) is non-uniform. In other words, the optical scanners described in the respective Publications 1 and 2 do not suppress image formation misregistration, on the assumption that the temperature distribution in the optical housing is non-uniform, due to the heat generated by the deflector which rotates at a high speed. Thus, the optical scanners described in the respective Publications 1 and 2 have a problem in that even if measures as described in each publication are taken, the beam diameter of the optical beam and a pitch deflection of a vertical scanning beam pitch of multi-beam are deteriorated.

In the optical scanner in the Publication 2, as described above, a resin lens having a negative power is used for the first image formation optical system, so that an image formation misregistration which occurs in the second image formation optical system is cancelled. However, in order to improve the correction result of the image formation misregistration, it is necessary to set the negative power of the resin lens large. Thereby, machining of the resin lens becomes difficult, and there is another problem in that the wave front aberration is deteriorated.

SUMMARY OF THE INVENTION

It is a first object of the present invention to provide an optical scanner that can reduce changes of beam diameter due to a temperature change and a pitch deflection of a vertical scanning beam pitch of multi-beam.

It is a second object of the present invention to provide an optical scanner that can reduce changes of beam diameter due to a temperature change and a pitch deflection of a vertical scanning beam pitch of multi-beam, as well as realizes a smaller diameter by obtaining excellent wave front aberration.

It is a third object of the present invention to provide an image formation apparatus that can output a stable high-quality image excellent in granularity, resolution and gradient, by using the optical scanner that can reduce changes of beam diameter due to a temperature change and a pitch deflection of a vertical scanning beam pitch of multi-beam, as well as realizing a smaller diameter.

The optical scanner according to one aspect of the present invention comprises a first optical system having a coupling lens that couples a light flux from a light source; a second optical system that forms the light flux into a line image extending in the horizontal scanning direction, on a deflector, the second optical system including a glass lens having a positive power in a vertical scanning direction, or a resin lens having a positive power in the vertical scanning direction; a third optical system having a scanning image formation device that condenses the light flux deflected by the deflector as an optical beam spot on a surface to be scanned, the third optical system including a first optical element made of resin, having a positive power in the horizontal scanning direction, and a second optical element made of resin, having a positive power in the vertical scanning direction; and a temperature distribution generation unit which controls atmospheric temperature T1 near the first resin optical element, and atmospheric temperature T2 near the second resin optical element such that T1>T2. The an absolute value of a lateral magnification in the horizontal scanning direction of an optical system, which includes the first optical system, the second optical system, and the third optical system, is set larger than an absolute value of a lateral magnification in the vertical scanning direction of the optical system.

The optical scanner according to another aspect of the present invention comprises a first optical system having a coupling lens that couples a light flux from a light source; a second optical system that forms the light flux into a line image extending in the horizontal scanning direction, on a deflector, the second optical system including a glass lens having a positive power in a vertical scanning direction and a resin lens having a negative power in the vertical scanning direction; a third optical system having a scanning image formation device that condenses the light flux deflected by the deflector as an optical beam spot on a surface to be scanned, the third optical system including a first optical element made of resin, having a positive power in the horizontal scanning direction, and a second optical element made of resin, having a positive power in the vertical scanning direction; and a temperature distribution generation unit which controls atmospheric temperature T1 near the first optical element, and atmospheric temperature T2 near the second optical element such that T1>T2. The an absolute value of a lateral magnification in the horizontal scanning direction of an optical system, which includes the first optical system, the second optical system, and the third optical system, is set larger than an absolute value of a lateral magnification in the vertical scanning direction of the optical system.

The image formation apparatus according to still another aspect of the present invention employs the optical scanner according to the present invention.

These and other objects, features and advantages of the present invention are specifically set forth in or will become apparent from the following detailed descriptions of the invention when read in conjunction with the accompanying drawings.

DETAILED DESCRIPTIONS

The embodiments of the optical scanner and the image formation apparatus according to the present invention will be explained below in detail while referring to the accompanying drawings.

Figure 1:
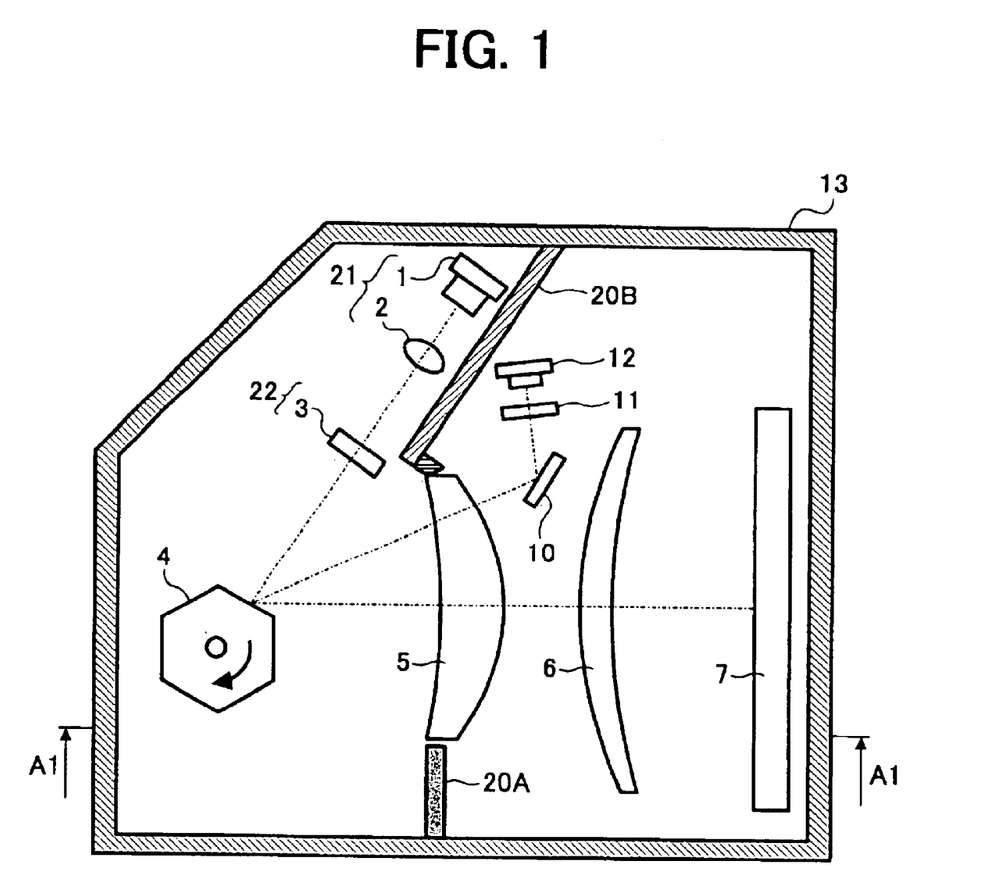
FIG. 1 is a block diagram of the configuration of an optical scanner according to a first embodiment.
Figure 2:
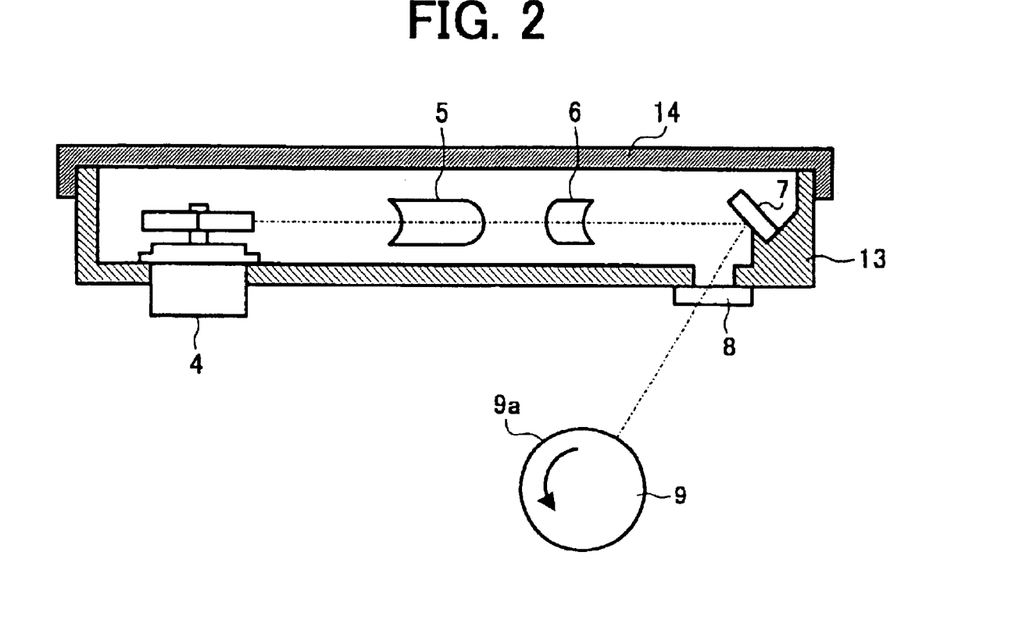
FIG. 2 is a cross sectional view along the line A1—A1 in FIG. 1, FIG. 3 explains an optical system in the optical scanner shown in FIG. 1.

FIG. 1 is a block diagram of the configuration of the optical scanner according to a first embodiment of the present invention. FIG. 2 is a cross sectional view along the line A1—A1 in FIG. 1.

As shown in FIG. 1, the light flux emitted from a light source 1 is coupled in a desired state of light flux by a coupling lens 2. Here, the light flux is coupled substantially in a parallel light flux. As for the light source 1, there can be used a semiconductor laser array having a semiconductor laser and a plurality of light emitting points, or a multi-beam using a beam combining-type light source which combines optical beams from the semiconductor laser by a prism or the like. The coupling lens 2 is an aspherical lens having a single lens. The wave front aberration by the coupling lens 2 alone is favorably corrected. The light flux emitted from the coupling lens 2 enters into a lens 3 having a power in the vertical scanning direction, and is condensed substantially linearly, extending in the horizontal scanning direction in the vicinity of a deflecting reflective surface of a deflector 4.

The light flux deflected by the deflecting reflective surface of the deflector 4 transmits through a first scanning lens 5 having a power in the horizontal scanning direction and a second scanning lens 6 having a power in the vertical scanning direction, while being deflected isometrically, with uniform rotation of the deflector 4. The optical path of this transmitting light flux is bent by a bending mirror 7, while the curvature of field respectively and optical characteristics such as fθ characteristic in the horizontal scanning direction and in the vertical scanning direction are being corrected via the first scanning lens 5 and the second scanning lens 6, and an image is formed on a surface to be scanned 9a of an image supporting body 9, via a window 8, as shown in FIG. 2.

The beams enter into a mirror 10 prior to optical scanning, and are condensed into a photodetector 12 by a lens 11. Write timing in the optical scanning is determined based on the output of the photodetector 12. The optical components (e.g., optical elements) denoted by reference numerals 1 to 7 are housed in a housing 13. The housing 13 is covered with a cover 14, and the inside is substantially in a closed state.

Reference numerals 20A and 20B in FIG. 1 denote ribs for preventing heat generated by the deflector 4 from being transmitted towards the second scanning lens 6. The ribs 20A and 20B do not hinder the heat transmission completely, but is formed in such a manner that the temperature T1 in an atmosphere in the vicinity of the first scanning lens 5 becomes higher than the temperature. T2 in an atmosphere in the vicinity of the second scanning lens 6. In other words, the ribs 20A and 20B generate a temperature distribution so as to satisfy the relation temperature T1>temperature T2. These ribs 20A and 20B correspond to the temperature distribution generation unit described in the claims.

Figure 3:
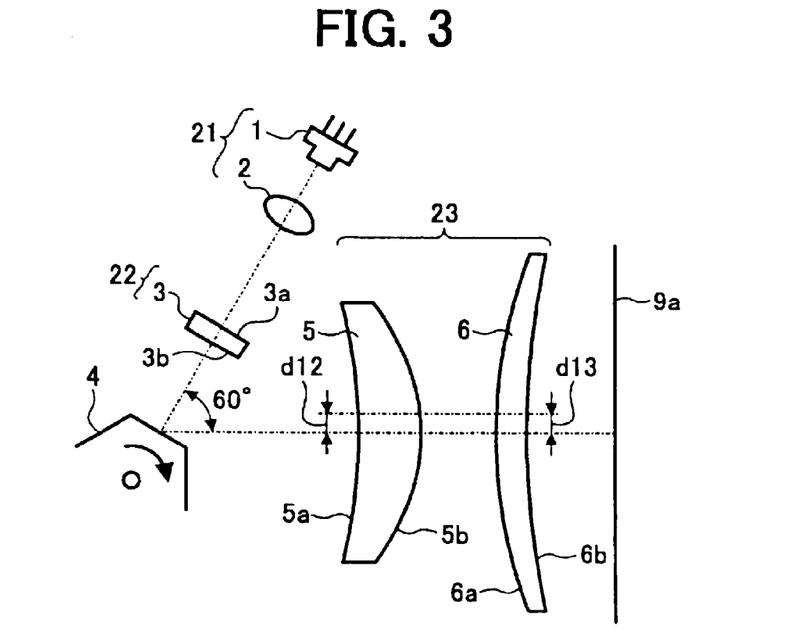

The optical system in the optical scanner according to the first embodiment will be explained below, with reference to FIG. 3. FIG. 3 is a diagram which explains the optical system in the optical scanner shown in FIG. 1. In FIG. 3, from the light source 1 to the coupling lens 2 are termed as a first optical system 21, the lens 3 is termed as a second optical system 22, and an optical system formed of the first and second scanning lenses 5 and 6 is termed as a third optical system 23. The first scanning lens 5 corresponds to a first optical element made of resin, and the second scanning lens 6 corresponds to a second optical element made of resin.

As well known, the deflector 4 rotates at a high speed and becomes a heat source. In the Example 1, however, the ribs 20A and 20B are provided in the vicinity of the first scanning lens 5, as shown in FIG. 1, so as to positively utilize the heat source, thereby generating a temperature distribution which realizes the relation: temperature T1>temperature T2.

Specifically, in the first to the third optical systems, the following temperature distributions are obtained. That is, Temperature T01 in the first optical system 21=45° C., Temperature T02 in the second optical system 22=45° C., Temperature T1 in the vicinity of the first scanning lens 5=45° C., and Temperature T2 in the vicinity of the second scanning lens 6=35° C.

The expression of the shape of the lens surface of a lens which constitutes a scanning image formation device, that is, the scanning optical system depends on the following polynomial.

The surface shape of the lens surface in the horizontal scanning cross section forms a non-arc shape, and this non-arc shape is expressed by the following polynomial (1)

$$X=(Y^2/Rm)/[1+\sqrt{1-(1+K)(Y/Rm)^2}]+A1 \cdot Y+A2 \cdot Y^2+A3 \cdot Y^3+A4 \cdot Y^4+A5 \cdot A6 \cdot Y^6 \quad (1)$$

wherein Rm denotes a paraxial radius of curvature in the horizontal scanning cross section, Y denotes a distance from the optical axis in the horizontal scanning direction, K denotes a conical constant, A1, A2, A3, A4, A5, A6, . . . denote higher-order coefficients, and X denotes a depth in the direction of optical axis.

In the polynomial (1), when a numerical value other than zero is substituted for coefficients A1, A3, A5, . . . of the odd order, the non-arc shape becomes an asymmetric shape in the horizontal scanning direction. In the first embodiment, since only the even order is used in the polynomial (1), the non-arc shape becomes a symmetric shape in the horizontal scanning direction.

The radius of curvature of the lens surface in the vertical scanning cross section is expressed by the following polynomial (2), when the radius of curvature in the vertical scanning cross section changes in the horizontal scanning direction (expressed by coordinates (coordinate value Y) in which the optical axis is designated as an origin), $$Cs(Y)=1/Rs(0)+B1 \cdot Y+B2 \cdot Y^2+B3 \cdot Y^3+B4 \cdot Y^4+B5 \cdot Y^5+ \quad (2)$$

wherein Rs(0) denotes a radius of curvature on the optical axis (Y=0) in the vertical scanning cross section, B1, B2, B3, B4, B5, . . . denote higher-order coefficients. In the polynomial (2), when a numerical value other than zero is substituted for coefficients B1, B3, B5, . . . of the odd order, changes of the radius of curvature in the vertical scanning cross section become asymmetric in the horizontal scanning direction.

The secondary non-arc surface is expressed by the following equation 1.

$$X(Y,Z) = \frac{C_m Y^2}{1+\sqrt{1-(1+K)C_m^2 Y^2}} + \sum_{n=1}^{p} a_n Y^n + \frac{C_S(Y)Z^2}{1+\sqrt{1-(1+K_Z(Y))C_S^2(Y)Z^2}} + \sum_{j=1}^{r}\left(\sum_{h=0}^{q} d_{j,h}Y^h\right)Z^j$$

The equation of the fourth term in this equation 1 is defined as the following equation 2:

$$f_{SAG}(Y,Z) = \sum_{j=1}^{r}\left(\sum_{h=0}^{q} d_{j,h}Y^h\right)Z^j.$$

This equation 2 can be broken down as shown in the following equation 3:

$$f_{SAG}(Y,Z)=(F0+F1 \cdot Y+F2 \cdot Y^2+F3 \cdot Y^3+F4 \cdot Y^4+\cdots) \cdot Z+(G0+G1 \cdot Y+G2 \cdot Y^2+G3 \cdot Y^3+G4 \cdot Y^4+\cdots) \cdot Z^2+(H0+H1 \cdot Y+H2 \cdot Y^2+H3 \cdot Y^3+H4 \cdot Y^4+\cdots) \cdot Z^3+(I0+I1 \cdot Y+I2 \cdot Y^2+I3 \cdot Y^3+I4 \cdot Y^4+\cdots) \cdot Z^4+(J0+J1 \cdot Y+J2 \cdot Y^2+J3 \cdot Y^3+J4 \cdot Y^4+\cdots) \cdot Z^5+\cdots$$

In equations 1 to 3, Y denotes a position of the vertical scanning cross section in the horizontal scanning direction (the coordinates in which a position of the optical axis is designated as an origin), Z denotes the coordinates in the vertical scanning direction, Cm or 1/Rm denotes a paraxial radius of curvature in the direction corresponding to the horizontal scanning in the vicinity of the optical axis, Cs(0) or 1/Rs(0) denotes a paraxial radius of curvature in the direction corresponding to the vertical scanning in the vicinity of the optical axis, Cs(Y) denotes a paraxial radius of curvature in the direction corresponding to the vertical scanning in the direction Y corresponding to the horizontal scanning, Kz(Y) denotes a conical constant expressing a quadratic surface in the direction corresponding to the vertical scanning in the direction Y corresponding to the horizontal scanning, and $f_{SAG}(Y, Z)$ denotes a higher-order correction amount of an aspheric surface.

The paraxial radius of curvature Cs in the direction corresponding to the vertical scanning is expressed by the following polynomial (3), and the conical constant Kz expressing a quadratic surface in the direction corresponding to the vertical scanning is expressed by the following polynomial (4):

$$Cs=1/Rs(0)+B1 \cdot Y+B2 \cdot Y^2+B3 \cdot Y^3+B4 \cdot Y^4+B5 \cdot Y^5+\ldots \quad (3),$$

$$Kz=C0+C1 \cdot Y+C2 \cdot Y^2+C3 \cdot Y^3+C4 \cdot Y^4+C5 \cdot Y^5+\ldots \quad (4).$$

In the polynomial (3), when a numerical value other than zero is substituted for coefficients B1, B3, B5, . . . of the odd order of Y, changes of radius of curvature in the vertical scanning cross section becomes asymmetric in the horizontal scanning direction.

Similarly, when a numerical value other than zero is substituted for coefficients of the odd order of Y, expressing a non-arc amount, such as C1, C3, C5, . . . , F1, F3, F5, . . . , and G1, G3, G5, . . . , changes of the non-arc amount in the vertical scanning cross section becomes asymmetric in the horizontal scanning direction.

EXAMPLE 1

Figure 4:
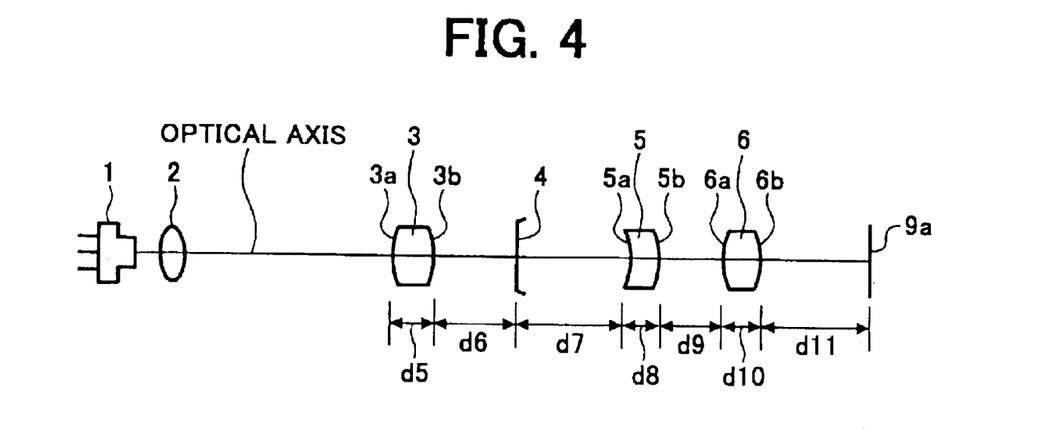
FIG. 4 is a sectional view which shows a surface perpendicular to the optical axis (a surface perpendicular to the face of paper) in the optical system shown in FIG. 3.

The size and arrangement of each component of the optical system in the optical scanner in Example 1 will be explained with reference to FIG. 3 and FIG. 4. FIG. 4 is a sectional view which shows a surface perpendicular to the optical axis (a surface perpendicular to the face of paper) in the optical system shown in FIG. 3.

The light source 1 emits laser-beams having a wavelength of 780 nm. The coupling lens 2 has a focal distance of 27 mm, and has a collimate action as the coupling action. The coefficient of linear expansion of a not-shown fitting section (base member) of the coupling lens 2 and the light source 1 is $2.31 \times 10^{-5}$.

The deflector 4 is formed of a polygon mirror, and the number of deflecting reflective surfaces thereof is 5, the radius of inscribed circle thereof is 18 mm, and an angle formed by the incident direction of beams from the light source 1 and the optical axis of the scanning optical system (the first and second scanning lenses 5 and 6) is 60 degrees (see FIG. 3).

The lens 3 is formed of a glass lens having a positive power in the vertical scanning direction. The refractive index of the glass lens as the lens 3 is 1.51119 at a temperature of 25° C., 1.51113 at a temperature of 45° C. and the coefficient of linear expansion of the glass lens is $7.5 \times 10^{-6}$. The thickness d5 of the lens 3 (the distance between the plane 3a and the plane 3b on the optical axis) is 3 mm, and the distance d6 between the plane 3b of the lens 3 and the reflective surface of the deflector 4 on the optical axis is 44.8 mm (see FIG. 4). The radius of curvature of the plane 3a of the lens 3 is ∞ in the horizontal scanning direction and 23 mm in the vertical scanning direction, and the radius of curvature of the plane 3b thereof is ∞ (plane)

A scanning lens made of resin is used as the first scanning lens 5, and a scanning lens made of resin is used as the second scanning lens 6. The refractive index of the resin scanning lens as the first scanning lens 5 and the second scanning lens 6 is 1.523978 at a temperature of 25° C., 1.523088 at a temperature of 35° C., and 1.522197 at a temperature of 45° C. The coefficient of linear expansion of the resin scanning lens as the first scanning lens 5 and the second scanning lens 6 is $7 \times 10^{-5}$.

The distance d7 between the reflective surface of the deflector 4 and the plane 5a of the first scanning lens 5 on the optical axis is 71.6 mm, the thickness d8 of the first scanning lens 5 (the distance between the plane 5a and the plane 5b on the optical axis) is 30 mm, the distance d9 between the plane 5b of the first scanning lens 5 and the plane 6a (plane of incidence) of the second scanning lens 6 on the optical axis is 66.3 mm, the thickness d10 of the second scanning lens 6 (the distance between the plane 6a and the plane 6b on the optical axis) is 8.5 mm, the distance d11 between the plane 6b (outgoing plane) of the second scanning lens 6 and the surface to be scanned 9a on the optical axis is 159.33 mm, the distance d12 is 0.2 mm and the distance d13 is 0.2 mm (see FIG. 4). The distance d12 and d13 is an amount of shift given by shifting the optical axis of the first and the second scanning lenses 5, 6 in the horizontal scanning direction in parallel, with respect to the optical axis.

Coefficients of the planes 5a and 5b of the first scanning lens 5, and the planes 6a and 6b of the second scanning lens 6 in the horizontal scanning direction and in the vertical scanning direction are listed in Tables 1 to 4, respectively. In Tables 1 to 4, Rm denotes a radius of curvature in the horizontal scanning direction, and Rs denotes a radius of curvature in the vertical scanning direction. "E+02" denotes $10^2$, and "E−08" denotes $10^{-8}$, and these figures affect the figure immediately before.

TABLE 1

Plane 5a

| Rm = −1030.233346 Coefficients in the horizontal scanning direction | | Rs = −89.518927 Coefficients in the vertical scanning direction | |
|---|---|---|---|
| A00 | −4.041619E+02 | B01 | −9.317851E−06 |
| A04 | +6.005017E−08 | B02 | +3.269905E−06 |
| A06 | −7.538155E−13 | B03 | +4.132497E−09 |
| A08 | −4.036824E−16 | B04 | −4.207716E−10 |
| A10 | +4.592164E−20 | B05 | −1.170114E−12 |
| A12 | −2.396524E−24 | B06 | +4.370640E−14 |
|  | BLANK | B07 | +2.347965E−16 |
|  |  | B08 | −6.212795E−18 |
|  |  | B09 | −3.967994E−20 |
|  |  | B10 | −3.873869E−21 |
|  |  | B11 | +3.816823E−24 |
|  |  | B12 | +4.535843E−25 |

TABLE 2

Plane 5b

| Rm = −109.082474 Coefficients in the horizontal scanning direction | | Rs = −110.881332 Coefficients in the vertical scanning direction | |
|---|---|---|---|
| A00 | −5.427642E−01 | B02 | −3.652575E−07 |
| A04 | +9.539024E−08 | B04 | +2.336762E−11 |
| A06 | +4.882194E−13 | B06 | +8.426224E−14 |
| A08 | −1.198993E−16 | B08 | −1.026127E−17 |
| A10 | +5.029989E−20 | B10 | −2.202344E−21 |
| A12 | −5.654269E−24 | B12 | +1.224555E−26 |

TABLE 3

Plane 6a

| Rm = +1493.654587 Coefficients in the horizontal scanning direction | | Rs = −70.072432 Coefficients in the vertical scanning direction | |
|---|---|---|---|
| A00 | +5.479389E+01 | B02 | −8.701573E−08 |
| A04 | −7.606757E−09 | B04 | +2.829315E−11 |
| A06 | −6.311203E−13 | B06 | −1.930080E−15 |
| A08 | +6.133813E−17 | B08 | +2.766862E−20 |
| A10 | −1.482144E−21 | B10 | +2.176995E−24 |
| A12 | +2.429275E−26 | B12 | −6.107799E−29 |
| A14 | −1.688771E−30 |  | Blank |

TABLE 4

Plane 6b (Secondary non-arc surface)

| Rm = +1748.583900 Coefficients in the horizontal scanning direction | | Rs = −28.034612 Coefficients in the vertical scanning direction | |
|---|---|---|---|
| A00 | −5.488740E+02 | B01 | −1.440188E−06 |
| A04 | −4.978348E−08 | B02 | +4.696142E−07 |
| A06 | +2.325104E−12 | B03 | +1.853999E−11 |
| A08 | −7.619465E−17 | B04 | −4.153092E−11 |
| A10 | +3.322730E−21 | B05 | −8.494278E−16 |
| A12 | −3.571328E−26 | B06 | +2.193172E−15 |
| A14 | −2.198782E−30 | B07 | +9.003631E−19 |
|  | Blank | B08 | −9.271637E−21 |
|  |  | B09 | −1.328111E−22 |
|  |  | B10 | −1.409647E−24 |

TABLE 4-continued

Plane 6b (Secondary non-arc surface)

| Rm = +1748.583900 Coefficients in the horizontal scanning direction | | Rs = −28.034612 Coefficients in the vertical scanning direction |
|---|---|---|
| | B11 | +5.520183E−27 |
| | B12 | +4.513104E−30 |
| | C00 | −9.999999E−01 |
| | I00 | −1.320849E−07 |
| | I02 | −1.087674E−11 |
| | I04 | −9.022577E−16 |
| | I06 | −7.344134E−20 |
| | K00 | +9.396622E−09 |
| | K02 | +1.148840E−12 |
| | K04 | +8.063518E−17 |
| | K06 | −1.473844E−20 |

In the Example 1, a temperature distribution described below is obtained by the heat source of the deflector 4 which rotates at a high speed. That is, T01=T02=T1=45° C., and T2=35° C. T01 is a temperature in the first optical system 21, T02 is a temperature in the second optical system 22, T1 is a temperature in an atmosphere in the vicinity of the first scanning lens 5, and T2 is a temperature in an atmosphere in the vicinity of the second scanning lens 6. The definitions of T01, T02, T1 and T2 apply similarly to Examples 2 to 4 described below.

Examples of results of changes in the curvature of field occurring in the first to the third optical systems 21, 22 and 23 under the above-described temperature distribution are shown in Table 5.

TABLE 5

| | Before taking measures (unit: mm) | | Examples (unit: mm) | |
|---|---|---|---|---|
| | Horizontal scanning | Vertical scanning | Horizontal scanning | Vertical scanning |
| Changes in curvature of field by first optical system | −0.43 | −0.01 | −0.43 | −0.01 |
| Changes in curvature of field by second optical system | 0.00 | 0.01 | 0.00 | 0.01 |
| Changes in curvature of field by first scanning lens | 1.10 | 0.03 | 1.10 | 0.03 |
| Changes in curvature of field by second scanning lens | 0.00 | 1.46 | 0.00 | 0.73 |
| Total | 0.67 | 1.48 | 0.67 | 0.75 |

In Example 1, the lateral magnification of the whole optical system formed of the first optical system 21, the second optical system 22 and the third optical system 23 is such that the lateral magnification $\beta m$ in the horizontal scanning direction is 8.45, and the lateral magnification $\beta s$ in the vertical scanning direction is 1.55. In Table 5, since T01=T02=T1=T2=45° C. before taking measures, any temperature distribution does not occur in the optical housing.

In the first optical system 21, since the base member to which the light source 1 and the coupling lens 2 are fitted expands, the curvature of field in the horizontal scanning direction and in the vertical scanning direction changes to the negative side at the time of temperature rise. However, since the lateral magnification of the whole optical system is set so that the relation $|\beta m|>|\beta s|$ is realized, the amount of correction of the curvature of field by means of the first optical system 21 is such that the amount of correction is larger in the horizontal scanning direction than in the vertical scanning direction. Therefore, it is necessary to suppress in the vertical scanning direction the changes of curvature of field which occur in the third optical system 23. Hence, as described above, by setting T1 (45° C.)>T2 (35° C.), changes in curvature of field of the whole optical system can be suppressed.

As described above, according to the Example 1, changes in curvature of field of the first to the third optical systems 21, 22 and 23 due to the temperature change can be reduced, thereby the diameter of beams can be reduced and stabilized. Further, even if a multi-beam is used for the light source 1, since the change in curvature of field in the vertical scanning direction is small, the pitch deflection of the vertical scanning beam pitch can be reduced.

EXAMPLE 2

In Example 2, the optical system in the optical scanner has a configuration such that, in the configuration of the optical system in the optical scanner in Example 1 shown in FIG. 3, the coefficient of linear expansion of the fitting section (base member), to which the coupling lens 2 and the light source 1 are fitted, is changed from $2.31 \times 10^{-5}$ to $3.1 \times 10^{-5}$, and the lens made of glass as the lens 3 of the second optical system 22 is changed to a lens made of resin.

The radius of curvature of the plane 3a (plane of incidence) of the lens 3 formed of the resin lens is ∞ in the horizontal scanning direction and 23.57 mm in the vertical scanning direction, and the radius of curvature of the plane 3b (outgoing plane) of the lens 3 is ∞ (plane) The refractive index of the resin lens is 1.523978 at a temperature of 25° C., and 1.522197 at a temperature of 45° C. The coefficient of linear expansion of the resin lens is $7 \times 10^{-5}$.

Also in the Example 2, as in the Example 1, such a temperature distribution of T01=T02=T1=45° C., and T2=35° C. is obtained by the heat source of the deflector 4 which rotates at a high speed. Examples of results of changes in the curvature of field occurring in the first to the third optical systems 21, 22 and 23 under such a temperature distribution are shown in Table 6.

TABLE 6

| | Before taking measures (unit: mm) | | Examples (unit: mm) | |
|---|---|---|---|---|
| | Horizontal scanning | Vertical scanning | Horizontal scanning | Vertical scanning |
| Changes in | −0.73 | −0.02 | −0.73 | −0.02 |

TABLE 6-continued

| | Before taking measures (unit: mm) | | Examples (unit: mm) | |
|---|---|---|---|---|
| | Horizontal scanning | Vertical scanning | Horizontal scanning | Vertical scanning |
| curvature of field by first optical system | | | | |
| Changes in curvature of field by second optical system | 0.00 | 0.18 | 0.00 | 0.18 |
| Changes in curvature of field by first scanning lens | 1.10 | 0.03 | 1.10 | 0.03 |
| Changes in curvature of field by second scanning lens | 0.00 | 1.46 | 0.00 | 0.73 |
| Total | 0.37 | 1.64 | 0.37 | 0.91 |

In the Example 2, the lateral magnification of the whole optical system formed of the first optical system 21, the second optical system 22 and the third optical system 23 is such that the lateral magnification βm in the horizontal scanning direction is 8.45, and the lateral magnification βs in the vertical scanning direction is 1.55. In Table 6, since T01=T02=T1=T2=45° C. before taking measures, any temperature distribution does not occur in the optical housing.

In the first optical system 21, since the base member to which the light source 1 and the coupling lens 2 are fitted expands, the curvature of field in the horizontal scanning direction and in the vertical scanning direction changes to the negative side at the time of temperature rise. However, since the lateral magnification of the whole optical system is set so that the relation |βm|>|βs| is realized, the amount of correction of the curvature of field by means of the first optical system 21 is such that the amount of correction is larger in the horizontal scanning direction than in the vertical scanning direction, and the curvature of field in the vertical scanning direction moves in the positive direction by the second optical system 22 (the change in the curvature of field is 0.18 mm). Therefore, it is necessary to suppress in the vertical scanning direction the changes of curvature of field which occur in the third optical system 23. Hence, as described above, by setting T1 (45° C.)>T2 (35° C.), changes in curvature of field of the whole optical system can be suppressed.

As described above, according to the Example 2, the same working effects as those of Example 1 can be obtained.

EXAMPLE 3

Figure 5:
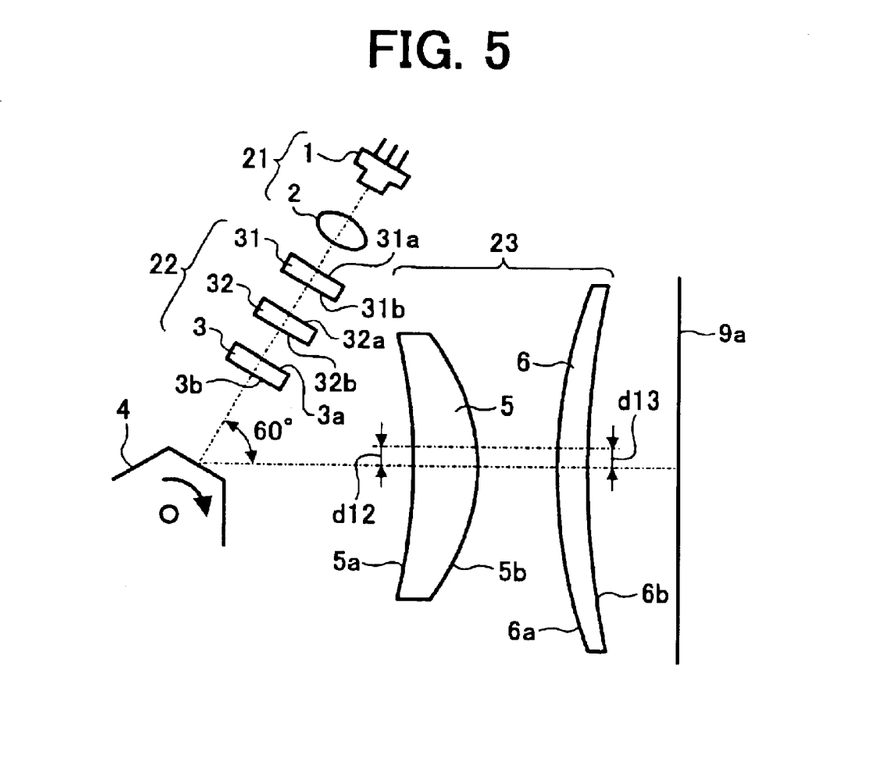
FIG. 5 is a block diagram of the configuration of another optical scanner according to the first embodiment.
Figure 6:
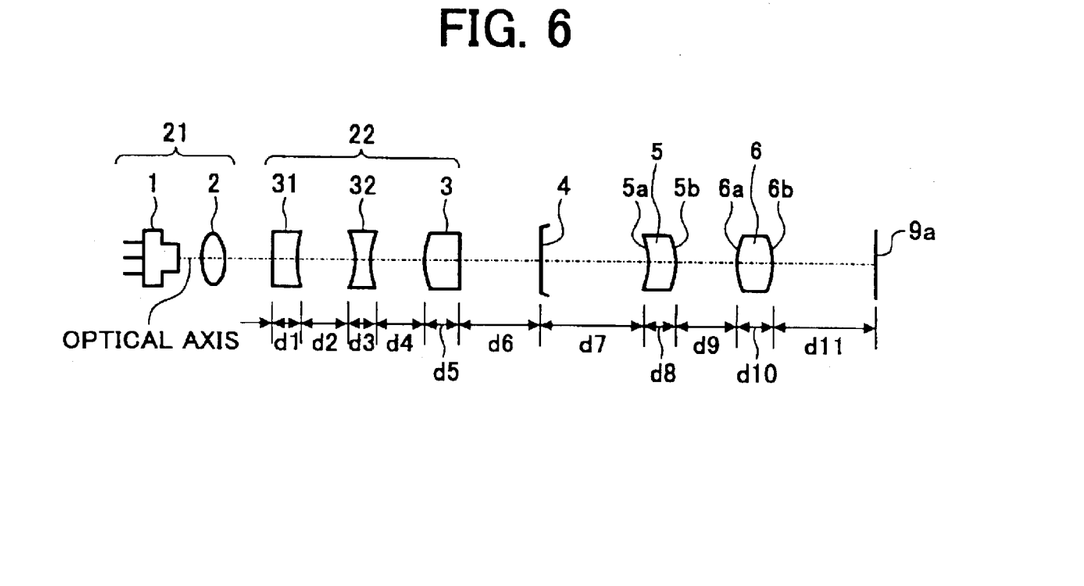
FIG. 6 is a sectional view which shows a surface perpendicular to the optical axis (a surface perpendicular to the face of paper) in the optical system shown in FIG. 5.
Figure 7:
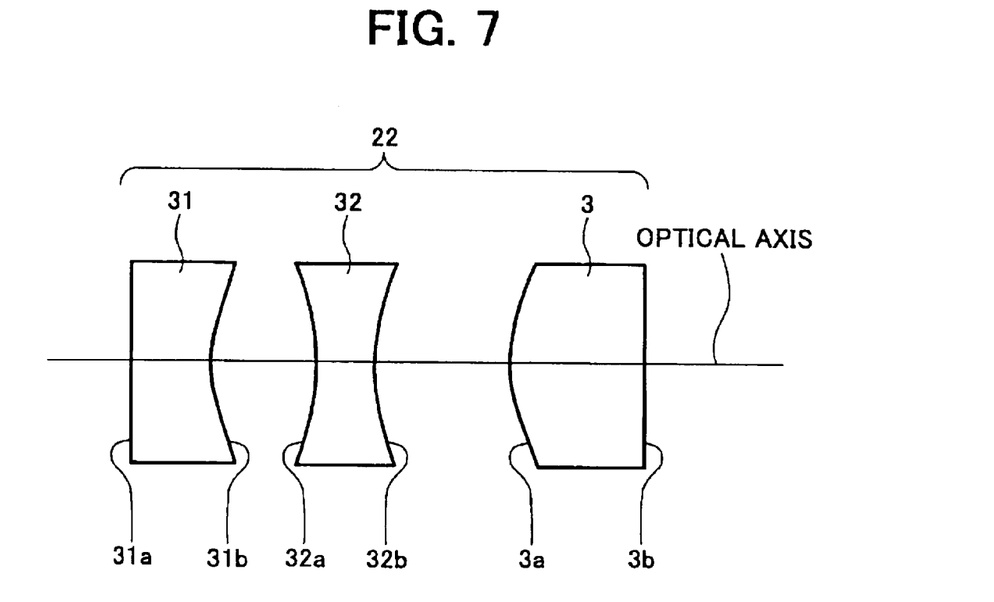
FIG. 7 is an enlarged diagram of each lens constituting the second optical system shown in FIG. 5 are enlarged.

The size and arrangement of each component of the optical system in the optical scanner in Example 3 will be explained with reference to FIG. 5 and FIG. 7. The optical system in the optical scanner shown in FIG. 5 has a configuration such that lenses 31 and 32 are added in the second optical system 22, in the configuration of the optical system in Example 1 shown in FIG. 3. In FIG. 5, the parts which function in the same manner as the optical system in the optical scanner shown in FIG. 3 are denotes by the same Reference numerals. FIG. 6 is a sectional view which shows a surface perpendicular to the optical axis (a surface perpendicular to the face of paper) in the optical system shown in FIG. 5. FIG. 7 is an enlarged diagram in which the shape and arrangement of the lens 3, the lens 31 and the lens 32 of the second optical are enlarged.

In FIG. 7, the lens 31 is formed of a lens made of resin, having a negative power only in the vertical scanning direction. The lens 32 is formed of a lens made of glass, having a negative power in the vertical scanning direction.

The radius of curvature of the plane 31a of the lens 31 is ∞ (plane), the radius of curvature of the plane 31b thereof is ∞ in the horizontal scanning direction and 19.82 mm in the vertical scanning direction. On the other hand, the radius of curvature of the plane 32a of the lens 32 is ∞ and −18.7 mm in the vertical scanning direction, the radius of curvature of the plane 32b thereof is 1.0E+8 in the horizontal scanning direction and 18.03 mm (secondary non-arc surface) in the vertical scanning direction. The radius of curvature of the plane 3a of the lens 3 is ∞ and 13.54 mm in the vertical scanning direction, and the radius of curvature of the plane 3b thereof is ∞ (plane).

The refractive index of the resin lens as the lens 31 is 1.523978 at a temperature of 25° C., and 1.522197 at a temperature of 45° C. The coefficient of linear expansion of the resin lens as the lens 31 is $7 \times 10^{-5}$. Further, the refractive index of the glass lens as the lens 32 is 1.51119 at a temperature of 25° C., and 1.51113 at a temperature of 45° C. The coefficient of linear expansion of the glass lens as the lens 32 is $7.5 \times 10^{-6}$. The refractive index of the glass lens as the lens 3 is 1.733278 at a temperature of 25° C., and 1.733058 at a temperature of 45° C. The coefficient of linear expansion of the glass lens as the lens 3 is $5.4 \times 10^{-6}$.

In FIG. 6, the thickness d1 of the lens 31 on the optical axis (the distance between the plane 31a and the plane 31b on the optical axis) is 3 mm, the distance d2 between the plane 31b (outgoing plane) of the lens 31 and the plane 32a (plane of incidence) of the lens 32 is 9.2 mm, the thickness d3 of the lens 32 (the distance between the plane 32a and the plane 32b on the optical axis) is 3 mm, the distance d4 between the plane 32b (outgoing plane) of the lens 32 and the plane 3a (plane of incidence) of the lens 3 is 8.15 mm, the thickness d5 of the lens 3 (the distance between the plane 3a and the plane 3b on the optical axis) is 6 mm, and the distance d6 between the plane 3b of the lens 3 and the reflective surface of the deflector 4 on the optical axis is 144 mm. In FIG. 6, respective values of d7 to d11 are the same as those of d7 to d11 in the optical system in Example 1 shown in FIG. 4.

Coefficients of the plane 32a of the lens 32 in the horizontal scanning direction and in the vertical scanning direction are listed in Table 7. This plane 32a has only a power in the vertical scanning direction. In Tables 7, Rm denotes a radius of curvature in the horizontal scanning direction, and Rs denotes a radius of curvature in the vertical scanning direction. E+01 denotes $10^1$, E−07 denotes $10^{-7}$, and these figures affect the figure immediately before.

TABLE 7

Plane 32a

| Rm = +1.00E+08 Coefficients in the horizontal scanning direction | | Rs = 18.03 Coefficients in the vertical scanning direction | |
|---|---|---|---|
| A04 | +1.287048E−07 | C00 | +3.681387E+01 |
| A06 | +1.615827E−09 | C02 | +1.882281E−01 |
|  | Blank | C04 | +1.542188E−02 |
|  |  | C06 | −4.096661E−04 |
|  |  | C08 | +5.584789E−06 |
|  |  | I00 | +3.496085E−04 |
|  |  | I02 | −2.319818E−06 |
|  |  | I04 | −7.859564E−08 |
|  |  | I06 | +7.462640E−10 |
|  |  | I08 | −2.952126E−11 |
|  |  | K00 | +6.055635E−06 |
|  |  | K02 | −1.070845E−06 |
|  |  | K04 | −1.078958E−07 |
|  |  | K06 | +2.023609E−09 |
|  |  | K08 | −2.307748E−11 |

In the Example 3, as in the Example 1, such a temperature distribution of T01=T02=T1=45° C., and T2=35° C. is obtained by the heat source of the deflector 4 which rotates at a high speed. Examples of results of changes in the curvature of field occurring in the first to the third optical systems 21, 22 and 23 described above, under such a temperature distribution are shown in Table 8.

TABLE 8

| | Before taking measures (unit: mm) | | Examples (unit: mm) | |
|---|---|---|---|---|
| | Horizontal scanning | Vertical scanning | Horizontal scanning | Vertical scanning |
| Changes in curvature of field by first optical system | −0.43 | −0.02 | −0.43 | −0.01 |
| Changes in curvature of field by second optical system | 0.00 | −0.75 | 0.00 | −0.75 |
| Changes in curvature of field by first scanning lens | 1.10 | 0.03 | 1.10 | 0.03 |
| Changes in curvature of field by second scanning lens | 0.00 | 1.46 | 0.00 | 0.73 |
| Total | 0.67 | 0.72 | 0.67 | −0.01 |

In the Example 3, the lateral magnification of the whole optical system formed of the first optical system 21, the second optical system 22 and the third optical system 23 is such that the lateral magnification $\beta m$ in the horizontal scanning direction is 8.45, and the lateral magnification $\beta s$ in the vertical scanning direction is 1.55. In Table 7, since T01=T02=T1=T2=45° C. before taking measures, any temperature distribution does not occur in the optical housing.

As is clearly seen from Table 8, in the second optical system 21, the curvature of field in the vertical scanning direction is corrected by using a resin lens as the lens 31 having a negative power in the vertical scanning direction, but the correction is still insufficient. It is necessary to further increase the negative power of the resin lens, in order to allow the resin lens as the lens 31 to have further correction function, thereby a problem in machining of the resin lens occurs, and a wave front aberration is deteriorated. Therefore, by setting T1 (45° C.)>T2 (35° C.) as described above, changes in curvature of field of the whole optical system can be suppressed.

One example of beam spot diameters at each image height in the Example 3 is shown in Table 9.

TABLE 9

| Image height (mm) | Beam diameter ($\mu$m) in horizontal scanning | Beam diameter ($\mu$m) in vertical scanning |
|---|---|---|
| 150 | 29.4 | 40.7 |
| 90 | 29.5 | 40.9 |
| 0 | 29.2 | 40.7 |
| −90 | 29.5 | 40.9 |
| −150 | 29.4 | 40.7 |

As described above, according to the Example 3, the same working effects as those in Example 1 are obtained. In Example 3, since it is not necessary to reduce the radius of curvature in the vertical scanning direction of the resin lens as the lens 31 having a negative power, the wave front aberration is not deteriorated. As is clearly seen from Table 9, excellent beam spot diameter can be obtained.

EXAMPLE 4

The optical system in the optical scanner in the Example 4 has a configuration such that, in the configuration of the optical system in the optical scanner in Example 3 shown in FIG. 5, a negative power in the horizontal scanning direction is added to the resin lens as the lens 31, and a positive power in the horizontal scanning direction is added to the glass lens as the lens 32.

In other words, the resin lens as the lens 31 has a negative power in the horizontal scanning direction, and a positive power in the vertical scanning direction. The glass lens as the lens 32 has a positive power both in the horizontal scanning direction and in the vertical scanning direction, and the glass lens as the lens 3 has a positive power in the vertical scanning direction.

The radius of curvature of the plane 31a of the lens 31 is ∞ (plane), and the radius of curvature of the plane 31b thereof is 150 mm in the horizontal scanning direction and 19.82 mm in the vertical scanning direction. The radius of curvature of the plane 32a of the lens 32 is 151 mm in the horizontal scanning direction and 150 mm in the vertical scanning direction. The radius of curvature of the plane 32b of the lens 32, and the radius of curvature of the planes 3a and 3b of the lens 3 are the same as those in Example 3. The refractive index and the coefficient of linear expansion of the lenses 31, 32 and 3 are the same as those in Example 3. In FIG. 6, respective values of d1 to d11 are the same as those in Example 3.

Also in the Example 4, as in the Example 1, such a temperature distribution of T01=T02=T1=45° C., and T2=35° C. is obtained by the heat source of the deflector 4 which rotates at a high speed. Examples of results of changes in the curvature of field occurring in the first to the third optical systems 21, 22 and 23 under such a temperature distribution are shown in Table 10.

TABLE 10

|  | Before taking measures (unit: mm) | | Examples (unit: mm) | |
| --- | --- | --- | --- | --- |
|  | Horizontal scanning | Vertical scanning | Horizontal scanning | Vertical scanning |
| Changes in curvature of field by first optical system | −0.40 | −0.02 | −0.40 | −0.02 |
| Changes in curvature of field by second optical system | −0.77 | −0.75 | −0.77 | −0.75 |
| Changes in curvature of field by first scanning lens | 1.10 | 0.03 | 1.10 | 0.03 |
| Changes in curvature of field by second scanning lens | 0.00 | 1.46 | 0.00 | 0.73 |
| Total | −0.07 | 0.72 | −0.07 | −0.01 |

In the Example 4, the lateral magnification of the whole optical system formed of the first optical system 21, the second optical system 22 and the third optical system 23 is such that the lateral magnification βm in the horizontal scanning direction is 8.45, and the lateral magnification βs in the vertical scanning direction is 1.55. In Table 7, since T01=T02=T1=T2=45° C. before taking measures, any temperature distribution does not occur in the optical housing.

As is obvious from Table 10, in the second optical system 21, the curvature of field in the vertical scanning direction is corrected by using a resin lens as the lens 31 having a negative power in the vertical scanning direction, but the correction is still insufficient. It is necessary to further increase the negative power of the resin lens, in order to allow the resin lens as the lens 31 to have further correction function, thereby a problem in machining of the resin lens occurs, and a wave front aberration is deteriorated. Therefore, by setting T1 (45° C.)>T2 (35° C.), as described above, changes in curvature of field of the whole optical system can be suppressed, and changes in curvature of field in the vertical scanning direction of the whole optical system can be suppressed.

In the Example 4, the resin lens as the lens 31 is only one, but the resin lens may be two. In this case, the two resin lenses may be a combination of a lens having only a negative power in the vertical scanning direction and a lens having only a power in the horizontal scanning direction, or the both lenses may have a negative power both in the vertical scanning direction and in the vertical scanning direction.

As explained above, according to the Example 4, the same working effects as those in Example 1 can be obtained.

Figure 8:
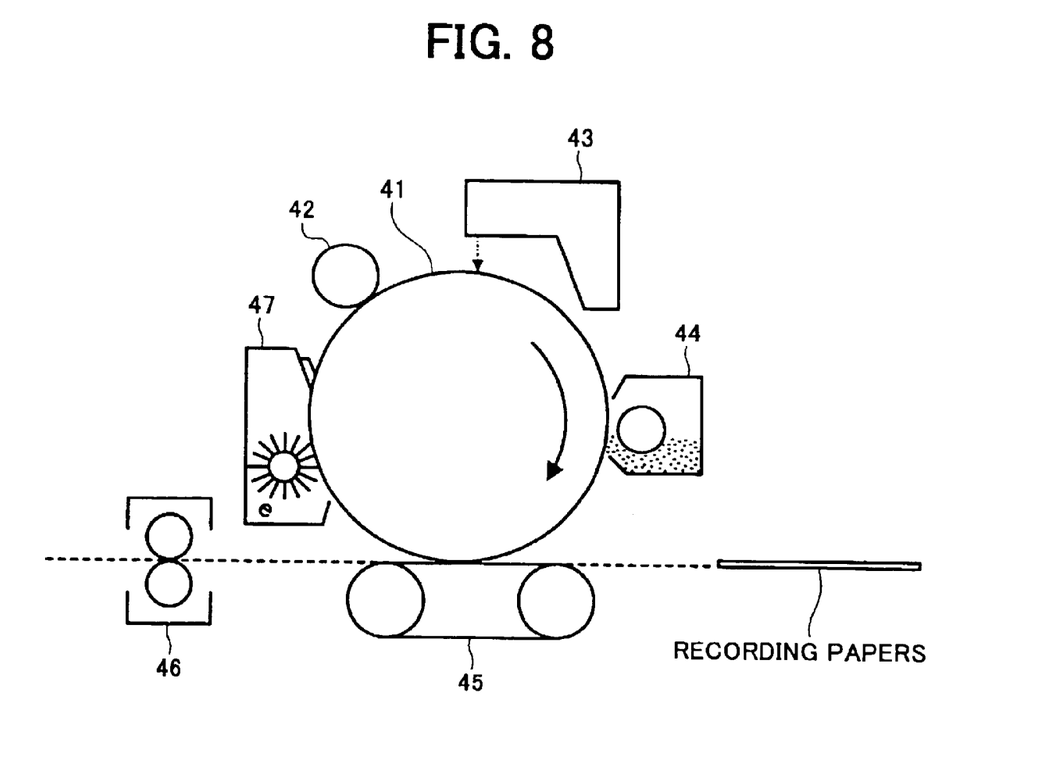
FIG. 8 is a block diagram of the configuration of the main part of an image formation apparatus according to a second embodiment.

FIG. 8 is a block diagram of the configuration of the main parts of an image formation apparatus according to a second embodiment of the present invention. In the image formation apparatus shown in FIG. 8, a charger 42, an optical scanner 43, a developing device 44, a transfer charger 45, a fixing device 46, and a cleaning device 47 are arranged around an image supporting body 41. The optical scanner 43 is, for example, the optical scanner in either one of Examples 1 to 4 in the first embodiment.

There is an electrophotographic process as a representative one of the image formation process for forming an image. In the electrophotographic process, an image is formed by a series of processes, such that a light beam spot from the optical scanner 43 is irradiated onto a photosensitive material as the image supporting body 41 uniformly charged by the charger 42, to form a latent image (exposure), a toner is adhered on the latent image by the developing device 44 to form a toner image (development) and the toner image is then transferred onto a recording paper S by the transfer charger 45 (transfer), and fused on the recording paper S by applying pressure and heat by the fixing device 46 (fixation).

As explained above, according to the second embodiment, high quality image can be obtained, by using the optical scanner as an exposure unit of the image formation apparatus.

According to the first aspect of the present invention, the optical scanner of the invention comprises a first optical system having a coupling lens, a second optical system which is formed of a glass lens having a positive power in the vertical scanning direction, or a resin lens having a positive power in the vertical scanning direction, and forms the light flux from a light source, having passed through the first optical system, into a line image extending in the horizontal scanning direction, on a deflector, and a third optical system which has a first optical element made of resin, having a positive power in the horizontal scanning direction, and a second optical element made of resin, having a positive power in the vertical scanning direction, and which condenses the light flux deflected by the deflector as an optical beam spot on a surface to be scanned. An absolute value of a lateral magnification in the horizontal scanning direction of the whole optical system, which is formed of the first optical system, the second optical system, and the third optical system, is set larger than an absolute value of a lateral magnification in the vertical scanning direction, and the temperature distribution generation unit makes it possible to satisfy the relation: the temperature near the first optical element T1 is greater than the temperature near the second optical element T2. As a result, changes of beam diameter of the optical beam due to a temperature change and a pitch deflection of a vertical scanning beam pitch of multi-beam can be reduced, thereby making it easy to have the multi-beam. Hence, the number of rotation of the deflector such as a polygon scanner can be reduced, to thereby provide an optical scanner that can realize high durability, low noise and low power consumption.

According to the second aspect of the present invention, the optical scanner comprises a first optical system having a coupling lens that couples a light flux from a light source, a second optical system that forms the light flux into a line image extending in the horizontal scanning direction, on a deflector, the second optical system including a glass lens having a positive power in a vertical scanning direction and a resin lens having a negative power in the vertical scanning direction, a third optical system having a scanning image formation device that condenses the light flux deflected by the deflector as an optical beam spot on a surface to be scanned, the third optical system including a first optical element made of resin, having a positive power in the horizontal scanning direction, and a second optical element made of resin, having a positive power in the vertical scanning direction, and a temperature distribution generation unit which controls an atmospheric temperature T1 near the first optical element and an atmospheric temperature T2 near the second optical element such that T1>T2. Moreover, an absolute value of a lateral magnification in the horizontal scanning direction of an optical system, which is formed of the first optical system, the second optical system, and the third optical system, is set larger than an absolute value of a lateral magnification in the vertical scanning of the optical system.

Moreover, the second optical system includes a resin lens having a negative power both in the horizontal scanning direction and in the vertical scanning direction and a plurality of glass lenses, at least one of those having a positive power in the vertical scanning direction. Hence, changes of beam diameter due to a temperature change and a pitch deflection of a vertical scanning beam pitch of multi-beam can be reduced. Further, by satisfying the relation T1>T2, the negative power in the vertical scanning direction of the resin lens can be decreased. The beam diameter can be also decreased, by obtaining excellent wave front aberration.

Furthermore, by using the optical scanner according to any one of the first to third aspects, an image formation apparatus which can output high quality images which are stable and excellent in granularity, resolution and gradient can be provided.

The present document is a continuation application of, and claims priority to, Ser. No. 10/247,702, filed on Sep. 20, 2002; U.S. Pat. No. 6,779,407,the entire content of which is incorporated herein by reference in its entirety. The present document also claims the benefit of Japanese priority documents, 2001-287766 and 2002-271602 filed in Japan on Sep. 20, 2001 and on Sep. 18, 2002, respectively, the entire contents of which are also incorporated herein by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical scanner, comprising:
   a first optical system having a coupling lens that couples a light flux from a light source, the first optical system being disposed in an environment in the optical scanner where the temperature is approximately a first temperature $T_1$;
   a second optical system that forms the light flux into a line image on a deflector, the line image extending in a horizontal scanning direction;
   a third optical system having first and second optical elements and a scanning image formation device that condenses the light flux deflected by the deflector as an optical beam spot on a surface to be scanned; and
   a temperature distribution generation unit configured to control the first temperature $T_1$ near the first optical element, and a second temperature $T_2$ near the second optical element such that $T_1>T_2$,
   wherein an absolute value of a lateral magnification in the horizontal scanning direction of an optical system, which includes the first optical system, the second optical system, and the third optical system, is set larger than an absolute value of a lateral magnification in a vertical scanning direction of the optical system.

2. The optical scanner of claim 1, wherein the coupling lens couples the light source substantially in a parallel light flux.

3. The optical scanner of claim 1, wherein the light source is a semiconductor laser.

4. The optical scanner of claim 3, wherein the light source further comprises a plurality of light emitting points.

5. The optical scanner of claim 1, wherein the light source is a multi-beam light source.

6. The optical scanner of claim 4, wherein light beams from the plurality of emitting points are combined by a prism.

7. The optical scanner of claim 1, wherein the coupling lens is an aspherical lens.

8. The optical scanner of claim 1, wherein the light flux emitted from the coupling lens enters a lens having a power in the vertical scanning direction and is condensed substantially linearly, extending in the horizontal direction in a vicinity of a deflecting reflective surface of the deflector.

9. The optical scanner of claim 8, wherein the light flux deflected by the deflecting reflective surface of the deflector transmits through a first scanning lens having a power in the horizontal scanning direction and a second scanning lens having a power in the vertical scanning direction, while being deflected isometrically, with uniform rotation of the deflector.

10. The optical scanner of claim 1, wherein a first scanning lens comprises a first optical element made of resin.

11. The optical scanner of claim 10, wherein a second scanning lens comprises a second optical element made of resin.

12. The optical scanner of claim 11, wherein a coefficient of thermal expansion of the first and second scanning lens is $7 \times 10^{-5}$.

13. The optical scanner of claim 1, wherein $T_1$ is approximately 45° C.

14. The optical scanner of claim 1, wherein $T_2$ is approximately 35° C.

15. The optical scanner of claim 1, wherein the second optical system includes a resin lens and a plurality of glass lenses.

16. The optical scanner of claim 15, wherein the resin lens has a negative power both in the horizontal scanning direction and in the vertical scanning direction.

17. The optical scanner of claim 16, wherein at least one of the glass lenses has a positive power in the vertical scanning direction.

18. A laser-beam printer, comprising:
   an optical scanner, the optical scanner further comprising:
   a first optical system having a coupling lens that couples a light flux from a light source, the first optical system being disposed in an environment in the optical scanner where the temperature is approximately a first temperature $T_1$;
   a second optical system that forms the light flux into a line image on a deflector, the line image extending in a horizontal scanning direction;
   a third optical system having first and second optical elements and a scanning image formation device that condenses the light flux deflected by the deflector as an optical beam spot on a surface to be scanned; and a temperature distribution generation unit configured to control the first temperature $T_1$ near the first optical element and a second temperature $T_2$ near the second optical element such that $T_1 > T_2$, wherein an absolute value of a lateral magnification in the horizontal scanning direction of an optical system, which includes the first optical system, the second optical system, and the third optical system, is set larger than an absolute value of a lateral magnification in a vertical scanning direction of the optical system.

19. A regular paper facsimile system, comprising:

an optical scanner, the optical scanner further comprising:

a first optical system having a coupling lens that couples a light flux from a light source, the first optical system being disposed in an environment in the optical scanner where the temperature is approximately a first temperature $T_1$;

a second optical system that forms the light flux into a line image on a deflector, the line image extending in a horizontal scanning direction;

a third optical system having first and second optical elements and a scanning image formation device that condenses the light flux deflected by the deflector as an optical beam spot an a surface to be scanned; and a temperature distribution generation unit configured to control the first temperature $T_1$ near the first optical element, and atmospheric temperature $T_2$ near the second optical element such that $T_1 > T_2$, wherein an absolute value of a lateral magnification in the horizontal scanning direction of an optical system, which includes the first optical system, the second optical system, and the third optical system, is set larger than an absolute value of a lateral magnification in a vertical scanning direction of the optical system.

20. A digital copying machine, comprising:

an optical scanner, the scanner further comprising:

a first optical system having a coupling lens that couples a light flux from a light source, the first optical system being disposed in an environment in the optical scanner where the temperature is approximately a first temperature $T_1$;

a second optical system that forms the light flux into a line image on a deflector, the line image extending in a horizontal scanning direction;

a third optical system having first and second optical elements and a scanning image formation device that condenses the light flux deflected by the deflector as an optical beam spot on a surface to be scanned; and a temperature distribution generation unit configured to control the first temperature $T_1$ near the first optical element and a second temperature $T_2$ near the second optical element such that $T_1 > T_2$, wherein an absolute value of a lateral magnification in the horizontal scanning direction of an optical system, which includes the first optical system, the second optical system, and the third optical system, is set larger than an absolute value of a lateral magnification in a vertical scanning direction of the optical system.

* * * * *